United States Patent
Cho

(10) Patent No.: US 8,902,273 B2
(45) Date of Patent: *Dec. 2, 2014

(54) DISPLAY APPARATUS HAVING VIDEO CALL FUNCTION, METHOD THEREOF, AND VIDEO CALL SYSTEM

(75) Inventor: Han-wook Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

This patent is subject to a terminal disclaimer.

(21) Appl. No.: 13/603,518

(22) Filed: Sep. 5, 2012

(65) Prior Publication Data

US 2012/0327171 A1 Dec. 27, 2012

Related U.S. Application Data

(63) Continuation of application No. 11/781,615, filed on Jul. 23, 2007, now Pat. No. 8,279,251.

(30) Foreign Application Priority Data

Nov. 21, 2006 (KR) .......................... 10-2006-0115510

(51) Int. Cl.
*H04N 7/14* (2006.01)

(52) U.S. Cl.
CPC ..................................... *H04N 7/141* (2013.01)
USPC ...................................................... 348/14.01

(58) Field of Classification Search
None
See application file for complete search history.

(56) References Cited

U.S. PATENT DOCUMENTS

| 5,734,415 A | 3/1998 | Hwang | |
| 6,876,379 B1 * | 4/2005 | Fisher | 348/14.02 |
| 7,355,619 B2 * | 4/2008 | Motohashi | 348/14.02 |
| 2002/0018114 A1 | 2/2002 | Shibata et al. | |
| 2002/0124051 A1 | 9/2002 | Ludwig et al. | |
| 2004/0145654 A1 | 7/2004 | Motohashi | |
| 2006/0125914 A1 | 6/2006 | Sahashi | |
| 2006/0152577 A1 * | 7/2006 | Hagendorf et al. | 348/14.01 |

FOREIGN PATENT DOCUMENTS

| CN | 1518326 A | 8/2004 |
| EP | 0848552 A1 | 6/1998 |
| EP | 1441522 A1 | 7/2004 |
| JP | 2002262249 A | 9/2002 |

(Continued)

OTHER PUBLICATIONS

Search Report dated Jun. 6, 2011 from the European Patent Office in counterpart application No. 07118943.5.
Office Action dated Mar. 31, 2011 from the State Intellectual Property Office of the People's Republic of China in counterpart application No. 200710162864.
Communication dated Oct. 12, 2011 from the Korean Intellectual Property Office in counterpart Korean application No. 10-2006-0115510.

(Continued)

*Primary Examiner* — Maria El-Zoobi
(74) *Attorney, Agent, or Firm* — Sughrue Mion, PLLC

(57) ABSTRACT

A display apparatus having a video call function, a control method for controlling the display apparatus, and a video call system that uses the display apparatus and control method are provided. The display apparatus includes: an external source connection unit to which an external source is connected; a camera connection unit to which a camera is connected; a network communication unit which enables network communication with other display apparatuses; and a controller which controls a codec processing unit to process a video signal from at least one of the camera and the external source and output the processed signal to the network communication unit during the video call. The display apparatus can share various information input from the camera, a microphone, and the external source with an opposite call party.

16 Claims, 7 Drawing Sheets

(56) References Cited

FOREIGN PATENT DOCUMENTS

| KR | 1990-0004182 Y1 | 5/1990 |
| KR | 10-0198799 B1 | 3/1999 |
| KR | 1019990032152 A | 5/1999 |
| KR | 1019990050604 A | 7/1999 |
| KR | 2000-0043101 A | 7/2000 |
| WO | 2004/017636 A1 | 2/2004 |

OTHER PUBLICATIONS

Communication dated Jun. 29, 2010 from the State Intellectual Property Office of the People's Republic of China in counterpart Chinese application No. 200710162686.4.

Non-Final Office Action dated Sep. 27, 2011, issued in U.S. Appl. No. 11/781,615.

Final Office Action dated Feb. 8, 2012, issued in U.S. Appl. No. 11/781,615.

* cited by examiner

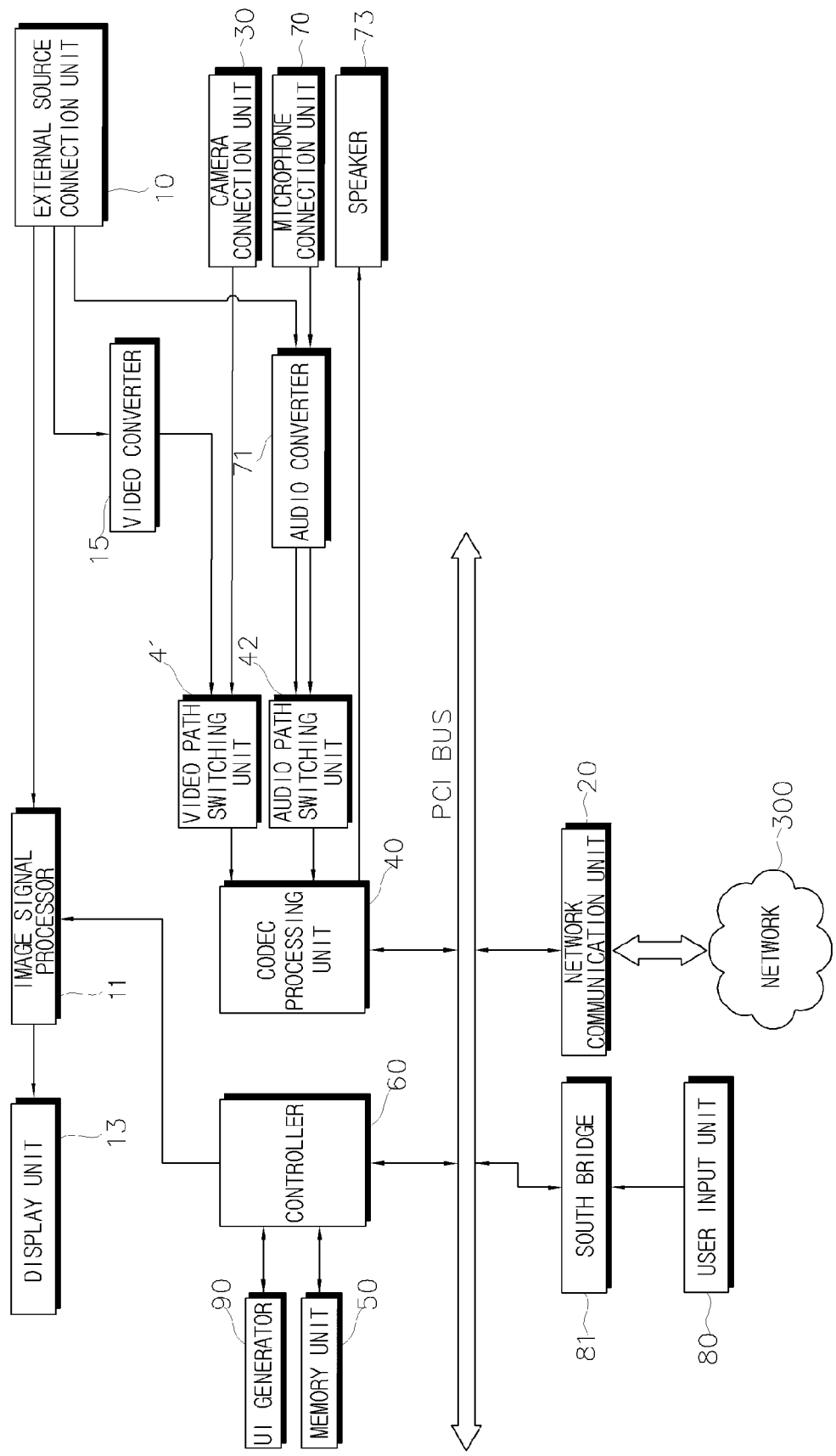

DISPLAY APPARATUS HAVING VIDEO CALL FUNCTION, METHOD THEREOF, AND VIDEO CALL SYSTEM

CROSS-REFERENCE TO RELATED APPLICATIONS

This application is a Continuation Application of U.S. application Ser. No. 11/781,615, filed Jul. 23, 2007, which claims priority from Korean Patent Application No. 10-2006-0115510, filed on Nov. 21, 2006 in the Korean Intellectual Property Office, the disclosures of which are incorporated herein by reference in their entireties.

BACKGROUND OF THE INVENTION

1. Field of the Invention

Apparatuses and methods consistent with the present invention relate to a display apparatus having a video call function, a control method thereof, and a video call system, and more particularly, to selecting an input source for video call.

2. Description of the Related Art

In general, a display apparatus having a video call function can be operated in a video call mode and a monitor mode. The display apparatus is connected to a network and a video source (e.g., a personal computer, (PC), where the display apparatus performs a video call function in the video call mode, and operates as an ordinary monitor in the monitor mode.

A mode switching button may be additionally provided in the display apparatus for selecting a desired mode.

The display apparatus processes a signal input from the video source (e.g., PC) and displays an image in the monitor mode, and processes a signal input from a camera/microphone and transmits processed data to an opposite call party through a network. In this way, a video conference can be carried out in the video call mode.

However, a related art display apparatus having a video call function may have an input source that is limited to a camera and a microphone in the video call mode.

Therefore, various video/audio information cannot be shared in the video call mode, particularly, in a video conference mode, such that the conference cannot be efficiently carried out.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a display apparatus having a video call function that can share various information input from a camera, a microphone, and an external source with an opposite call party, a control method of the display apparatus, and a video call system using the display apparatus and the control method.

According to an aspect of the present invention, there is provided a display apparatus having a video call function, the display apparatus comprising: an external source connection unit to which an external source is connected; a camera connection unit to which a camera is connected; a network communication unit which enables external network communication; a codec processing unit which encodes a video signal input from at least one of the camera and the external source and, outputs the encoded signal to the network communication unit, and decodes a video/audio signal received through the network communication unit; a memory unit in which video source selection information related to a video input of the codec processing unit during a video call is stored; and a controller which controls the codec processing unit to process the video signal from at least one of the camera and the external source corresponding to the stored video source selection information and output the processed signal to the network communication unit during the video call.

The display may further comprise a video converter which converts the video signal input from the external source into an input format of the codec processing unit and outputs the converted signal to the codec processing unit.

The display may further comprise: a user input unit through which a user's command is input; and a user interface (UI) generator which generates a UI menu through which a user selects the video signal of at least one of the camera and the external source as the video input during the video call, wherein the controller controls the memory unit to store the video source selection information on the video input selected through the user input unit.

The controller may control the codec processing unit to combine a first video signal input from the camera and a second video signal input from the external source and output the combined signal to the network communication unit if both of the video signal from the camera and the video signal from the external source are selected as the video input of the memory unit.

The controller may control the codec processing unit to combine the video signal input through the network communication unit and the second video signal from the external source and internally output the combined signal during the video call.

The controller may control the codec processing unit to combine the video signal input through the network communication unit, the first video signal from the camera and the second video signal from the external source, and internally output the combined signal during the video call.

The display apparatus may further comprise a microphone connection unit to which a microphone is connected, wherein the codec processing unit encodes an audio signal input from at least one of the microphone and the external source and outputs the encoded signal to the network communication unit, the memory unit stores audio source selection information on an audio input of the codec processing unit during the video call, and the controller controls the codec processing unit to process the audio signal from at least one of the microphone and the external source corresponding to the stored audio source selection information and output the processed signal to the network communication unit.

The UI generator may generate the UI menu for a user to select the audio signal from at least one of the microphone and the external source as the audio input for the video call, and the controller may control the memory unit to store the audio source selection information on the audio input selected through the user input unit.

The display apparatus may further comprise: a microphone connection unit to which a microphone is connected; and an audio converter which converts an audio signal input from the microphone and the external source into an input format of the codec processing unit and outputs the converted signal to the codec processing unit, wherein the codec processing unit encodes the input audio signal from the audio converter and outputs the encoded signal to the network communication unit, the memory unit stores audio source selection information on an audio input of the codec processing unit for the video call, and the controller controls the audio converter to convert the audio signal from at least one of the microphone and the external source corresponding to the stored audio source selection information and output the converted signal to the codec processing unit for the video call.

The UI generator may generate the UI menu through which a user selects the audio signal from at least one of the microphone and the external source as the audio input for the video call, and the controller may control the memory unit to store the audio source selection information on the audio input selected through the user input unit in the memory unit.

According to another aspect of the present invention, there is provided a display apparatus having a video call function, the display apparatus may comprise: an external source connection unit to which an external source is connected; a camera connection unit to which a camera is connected; a network communication unit which supports external network communication; a codec processing unit which encodes a video signal and/or an audio signal and, outputs the encoded signal to the network communication unit, and decodes a video signal and/or an audio signal received through the network communication unit; a video path switching unit which controls an input path of a first video signal input to the codec processing unit from the camera and a second video signal input to the codec processing unit from the external source; a memory unit which stores video source selection information on a video input of the codec processing unit for a video call; and a controller which controls the video path switching unit to output at least one of the first and second video signals corresponding to the video source selection information stored in the memory unit to the codec processing unit for the video call.

The controller may control the video path switching unit to output the first and second video signals to the codec processing unit if both of the first video signal from the camera and the second video signal from the external source are set to the video input in the memory unit, and the codec processing unit may combine the first video signal and the second video signals and outputs the combined signal to the network communication unit.

The display apparatus may further comprise: a microphone connection unit to which a microphone is connected; and an audio path switching unit which controls an input path of a first audio signal input from the microphone to the codec processing unit and a second audio signal input from the external source to the codec processing unit, wherein the memory unit stores audio source selection information on an audio input of the codec processing unit for the video call, and the controller controls the audio path switching unit to output at least one of the first audio signal and the second audio signal corresponding to the audio source selection information stored in the memory unit for the video call.

The display apparatus may further comprise: a microphone connection unit to which a microphone is connected; an audio converter which converts an audio signal input from at least one of the microphone and the external source into an input format of the codec processing unit and outputs the converted signal to the codec processing unit; and an audio path switching unit that controls an input path of the first audio signal input from the microphone to the audio converter and the second audio signal input from the external source to the audio converter, wherein the codec processing unit encodes the audio signal input through the audio converter and outputs the encoded signal to the network communication unit, the memory unit stores audio source selection information on an audio input of the codec processing input for a video call, and the controller controls the audio path switch unit to output the audio signal from at least one of the microphone and the external source corresponding to the stored audio source selection information to the audio converter for the video call.

According to another aspect of the present invention, there is provided a video call system that may comprise: an external source; a first display apparatus connected with the external source, selectively processing at least one of a first video signal input from a camera and a second video signal input from the external source and outputting the processed signal through network communication; and a second display apparatus connected with the first display apparatus through the network communication, and processing a video signal input from the first display apparatus and displaying the processed signal as an image.

The first display apparatus may selectively process at least one of a first audio signal input from a microphone and a second audio signal input from the external source and transmit the processed signal to the second display apparatus, and the second display apparatus may process an audio signal input from the first display apparatus and output the processed signal to a speaker.

According to another aspect of the present invention, there is provided a method for controlling a display apparatus including an external source connection unit to which an external source is connected, a microphone connection unit to which a microphone is connected, and a network communication unit which supports network communication with other display apparatusess, and having a video call function, the method may comprise: selecting at least one of the camera and the external source as a video input for the video call; storing the selected video input as video source selection information; encoding a video signal input from at least one of the camera and the external source corresponding to the stored video source selection information for the video call; and networking the encoded video signal and transmitting the signal to a remote call party through the network communication unit.

According to an aspect of the invention, the method may further comprise: selecting at least one of the microphone and the external source as an audio input for the video call; storing the selected audio input as audio source selection information; and encoding an audio signal from at least one of the camera and the external source corresponding to the stored audio source selection information for the video call; and networking the encoded audio signal and the encoded video signal and transmitting the audio and video signals to the remote call party through the network communication unit.

BRIEF DESCRIPTION OF THE DRAWINGS

The above and other aspects and features of the present invention will become apparent and more readily appreciated from the following description of the exemplary embodiments, taken in conjunction with the accompanying drawings, in which:

FIG. 6 is a control block diagram of a display apparatus according to a third exemplary embodiment of the present invention.

Figure 1:
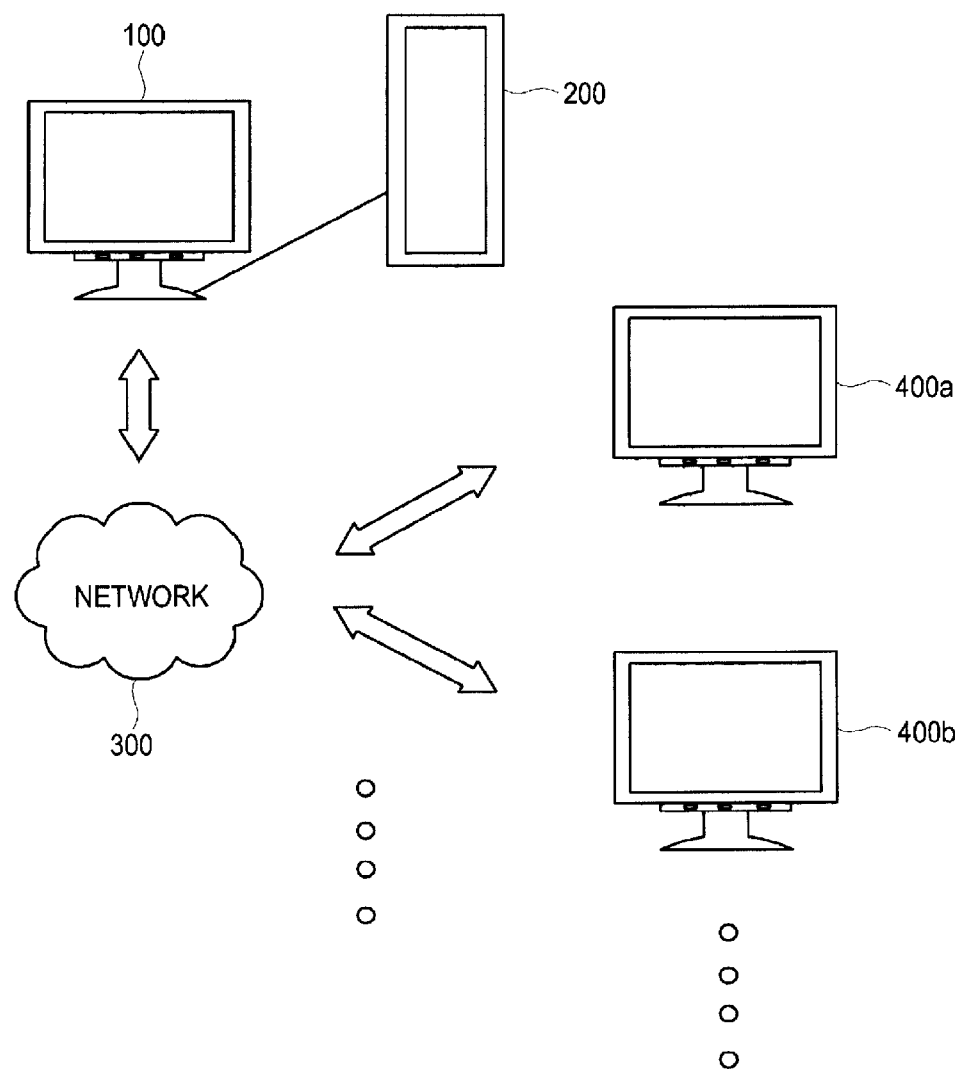
FIG. 1 is a schematic diagram of a video call system according to an exemplary embodiment of the present invention.

DETAILED DESCRIPTION OF THE ILLUSTRATIVE, NON-LIMITING EMBODIMENTS OF THE INVENTION

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

FIG. 1 is a schematic diagram of a video call system according to an exemplary embodiment of the present invention. The video call system according to an exemplary embodiment of the present invention includes a display apparatus 100 having a video call function, an external source 200 that can be directly connected to the display apparatus 100, a network 300 for communication of the display apparatus 100, and other display apparatuses 400A to 400N that perform a video call with the display apparatus 100.

The display apparatus 100 has a networking function, and accesses a server (not shown) to execute a program stored in a server and use data stored in the server. In addition, the display apparatus 100 can communicate with other display apparatuses 400A and 400B through the network 300.

The networking function of the display apparatus 100 includes a video call function, which allows a user of the display apparatus 100 to perform a video call with the other display apparatuses 400A and 400B through the network 300. Hereinafter, a video call function mode will be referred to as a video conference mode. The video call is supported by a voice over internet protocol (VoIP). Therefore, the display apparatus 100 and the other display apparatuses 400A and 400B respectively have a module that enables VoIP-based communication.

The display apparatus 100 may function as a general monitor as well. The display apparatus 100 is directly connected to the external source 200 and simply displays a video signal input from the external source 200.

The display apparatus 100 can be switched from a network function mode to a monitor function mode by using a mode switching key (e.g., a hotkey) provided in a main body casing of the display apparatus 100. Therefore, the user can select a desired mode by pressing the mode switching key.

The external source 200 is directly connected to the display apparatus 100 and outputs a video signal and/or an audio signal, and can be provided as various sources such as a (PC) or a digital versatile/video disk (DVD) player.

The display apparatus 100 according to an exemplary embodiment of the present invention can process signals input from a camera, a microphone, and the external source 200 and transmit the processed signals to the other display apparatuses 400A and 400B when performing a video call with the display apparatuses 400A and 400B.

Therefore, the display apparatus 100 can share data from the external source 200 by transmitting a signal from the external source 200 to an opposite call party unlike a related art display apparatus that transmits only a signal from a camera or a microphone.

The display apparatus 100 and the other display apparatuses 400A and 400B can perform network communication through an internet.

A further description of the display apparatus 100 according to an exemplary embodiment of the present invention will be provided later.

Figure 2:
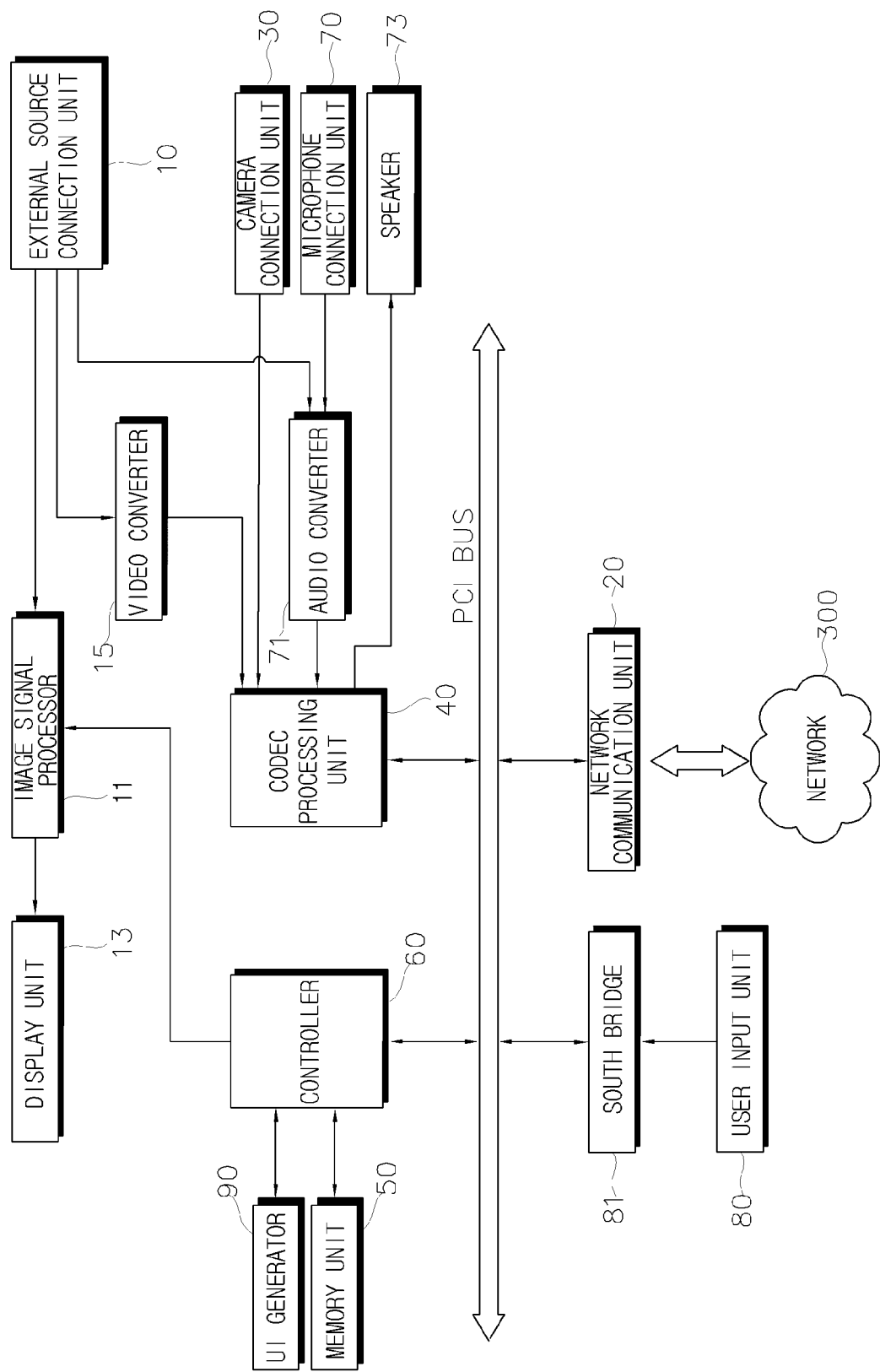
FIG. 2 is a control block diagram of a display apparatus 100 according to a first exemplary embodiment of the present invention.

FIG. 2 is a control block diagram of a display apparatus 100 according to a first exemplary embodiment of the present invention.

The display apparatus 100 according to the first exemplary embodiment of the present invention includes an external source connection unit 10, an image signal processor 11, a display unit 13, a network communication unit 20, a camera connection unit 30, a codec processing unit 40, a memory unit 50, and a controller 60.

The external source connection unit 10 can be realized as various interfaces. For example, but not by way of limitation, such interfaces may include a D-sub, a digital video/visual interface (DVI), a high definition multimedia interface (HDMI). The external source connection unit 10 is connected to the external source 200, which can be provided as a PC or a DVD player.

When the display apparatus 100 is operated in the monitor function mode (hereinafter referred to as a normal monitor mode), a signal input through the external source 200 is processed by the image signal processor 11 and displayed on the display unit 13. The image signal processor 11 may include a data converter (not shown) for converting a data format of the signal input from the external source 200 to be appropriate for a processing format of the image signal processor 11, and a scaler (not shown) for scaling the converted signal to be appropriate for an output scale of the display unit 13. For example, when the external source 200 is provided as a PC and the external source connection unit 10 is provided as a D-sub connector, the data converter can be realized as an analog-to-digital converter (A/D converter) that converts an analog video signal into a digital video signal.

The display unit 13 displays a video signal processed by the image signal processor 11 on a screen, and includes a display panel (not shown) on which an image is displayed and a panel driver (not shown) for controlling driving of the display panel. According to the first exemplary embodiment of the present invention, various types of display modules such as a digital light processing (DLP), a liquid crystal display (LCD), and a plasma display panel (PDP) can be provided to the display unit 13.

The network communication unit 20 processes network communication with other display apparatuses, and can be provided, for example, as a local area network (LAN) card.

An imaging device (e.g., a camera) (not shown) is connected to the camera connection unit 30, and the camera connection unit 30 receives a video signal taken by the camera and outputs the received signal to the codec processing unit 40.

The codec processing unit 40 encodes or decodes a video/audio signal, and can be provided as a codec chip, which is a digital signal processor. The codec processing unit 40 encodes a video signal input from the external source 200 and/or the camera into a predetermined transmission format, digitally packetizes the encoded video signal and outputs the packet signal to the network communication unit 20. The codec processing unit 40 decodes the data input from the network communication unit 20 into an internal processing format and outputs the decoded data to an internal module.

The codec processing unit 40 selectively processes an input video signal according to control of the controller 60. For example, the codec processing unit 40 may process a video signal input from only one of the camera and the external source 200 and output the processed signal to the network communication unit 20. The codec processing unit 40 may also output a video signal combined from both the camera and the external source 200 by using a picture-in-picture (PIP) function, a picture-by-picture (PBP) function, or a picture-out-picture (POP) function.

The memory unit 50 stores video source selection information that indicates a video input setting of the codec processing unit 40, and can be provided, for example, but not by way of limitation, as an electrically erasable and programmable read only memory (EEPROM).

The controller 60 controls overall operation of the display apparatus 100, and can be provided as a central processing unit (CPU) or a micro processing unit (MPU). When the display apparatus 100 is switched to the video call mode, the controller 60 controls the codec processing unit 40 to select and process a video signal according to a video input set in the memory 50.

For example, when the video input is set to the camera in the memory unit 50, the controller 60 controls the codec processing unit 40 to process a first video signal input from the camera, and when the video input is set to the external source 200 in the memory 50, the controller 40 controls the codec processing unit 40 to process a second video signal input from the external source 200. In addition, when the video input is set both to the camera and the external source 200 in the memory unit 50, the controller 60 controls the codec processing unit 40 to combine the first video signal input from the camera and the second video signal input from the external source 200 and process the combined signals.

According to the first exemplary embodiment of the present invention, a video signal input from the external source 200 can be shared by transmitting the signal to an opposite call party via the network 300 according to setting information stored in the memory unit 50.

Figure 3:
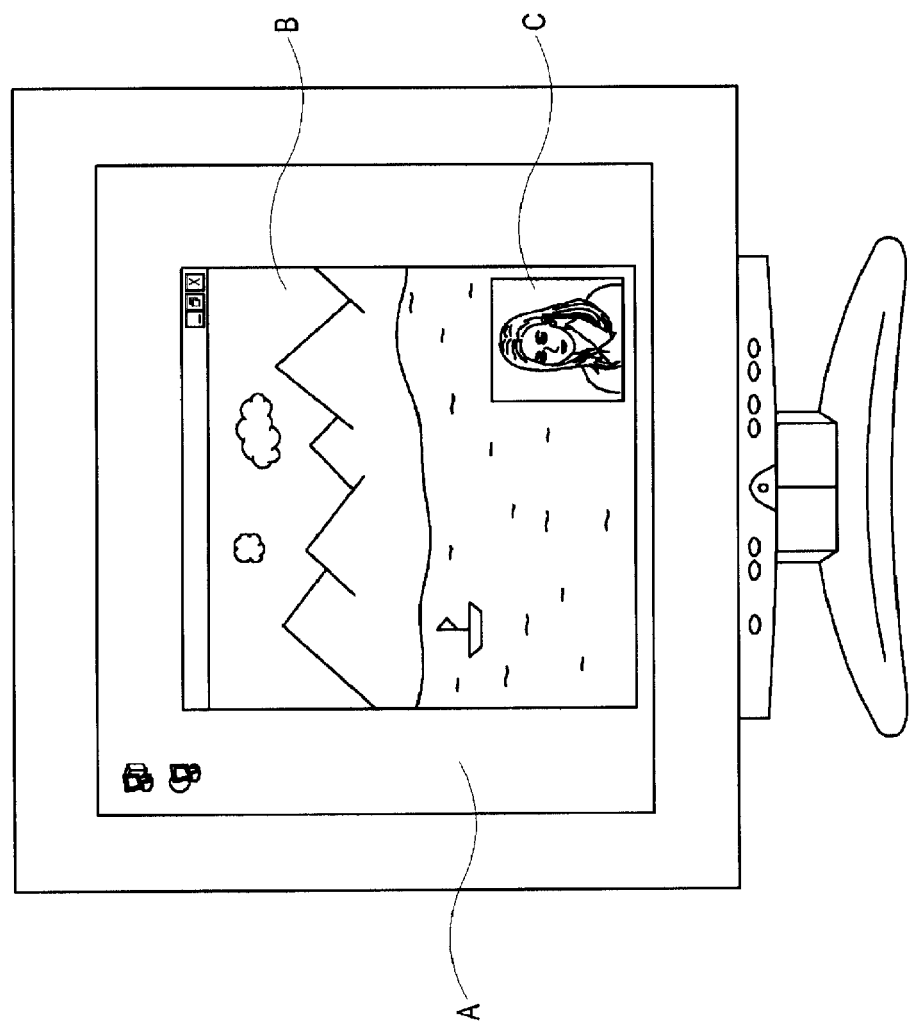
FIG. 3 shows a video call screen according to the first exemplary embodiment of the present invention.

FIG. 3 shows a combined image displayed on a receiving side-display apparatus. The combined image in FIG. 3 is formed by combining the first video signal and the second video signal and is then transmitted to a display apparatus 100 of an opposite call party according to the first exemplary embodiment of the present invention.

The first video signal input from the camera and the second video signal input from the external source 200 are combined and processed. Accordingly, a calling party and a called party can share data from the external source 200 during the call.

The display apparatus 100 according to the first exemplary embodiment of the present invention can be efficiently used when a user wants to share data from the external source 200 with an opposite call party, or for a conference meeting.

The display apparatus 100 according to an exemplary embodiment may further include a video converter 15. Referring to FIG. 2, the video converter 15 converts a data format of a video signal input from the external source 200 into an input format for the codec processing unit 40. For example, when the external source 200 is provided as the PC and an analog video signal is input from the PC, the video converter 15 can be provided as an A/D converter that converts an analog video signal into a digital video signal of the processing format of the codec processing unit 40. When the external source connection unit 10 is provided as a DVI or HDMI, the video converser 15 can be provided as a processing module that converts a digital input format to be appropriate for the codec processing unit 40.

In addition, the display apparatus 100 according to an exemplary embodiment may further include a microphone connection unit 70, an audio converter 71, and a speaker 73.

The microphone connection unit 70 is a terminal where the microphone is connected. The audio converter 71 converts an audio signal input through the microphone connection unit 70 into the input format of the codec processing unit 40. The audio converter 71 converts the analog audio signal input from the external source 200 into a digital audio signal of the input format of the codec processing unit 40, and can be provided, for example, as an A/D converter. In addition, the audio converter 71 can convert the audio signal input from the external source 200 to be appropriate for the input format of the codec processing unit 40.

The memory unit 50 may store audio source selection information that indicates an audio input in addition to the video source selection information. The controller 60 controls an audio input of the audio converter 71 according to the audio source selection information stored in the memory unit 50.

In other words, when the audio input is set to a microphone, the controller 60 controls the audio converter 71 to process only a first audio signal input from the microphone and outputs the processed signal to the network communication unit 20. When the audio input is set to the external source 200, the controller 60 controls the audio converter 71 to process only a second audio signal input from the external source 200 and output the processed signal to the network communication unit 20, corresponding to the audio source selection information. In addition, when both of the microphone and the external source 200 are set to the audio input in the memory unit 50, the audio converter 71 combines the two signals and processes the combined signals.

The codec processing unit 40 processes an audio signal output from the audio converter 71 based on the VoIP transmission protocol and transmits the processed audio signal to the network communication unit 20. The codec processing unit 40 also divides an audio signal from data of a remote party input through the network 300, decodes the audio signal, and outputs the decoded audio signal to the speaker 73 for a user.

Therefore, the opposite call party can hear the audio signal input from the external source in addition to voice of the user of the display apparatus 100, input through the microphone.

A method for setting a video input and an audio input included in the memory 50 will be described in further detail.

As shown in the first exemplary embodiment of FIG. 2, the display apparatus 100 may further include a user input unit 80, a South bridge 81, and a user interface (UI) generator 90.

The user input unit 80 receives a control command and data from a user. For example, but not by way of limitation, the user input unit 80 may be provided as a keyboard, a mouse, and/or a plurality of buttons. The control command and data input through the user input unit 80 are interfaced through the South bridge 81 and then interpreted by the controller 60 such that the controller 60 controls each element to perform an operation corresponding to the input of the user. The South bridge 81, the network communication unit 20, and the controller 60 are interfaced through a peripheral component interconnect (PCI) bus.

For example, mode conversion between the video call mode and the normal monitor mode can be performed by an input of the user input unit 80. The video input and the audio input can also be set by the input of the user input unit 80.

The UI generator 90 generates a UI menu for setting a video input of the codec processing unit 40 and an audio input of the audio converter 71, and can be provided as a manager program for a video conference function. The UI menu generated by the UI generator 90 is scaling-processed by the image signal processor 11 and displayed on the display unit 13.

The user may enter into the UI menu by manipulating the user input unit 80, and set a desired video input/audio input by entering a video/audio input data in an input menu or clicking a selection item displayed in the UI menu. When the video conference function is selected, the controller 60 stores a video/audio input entered or selected through the user input unit 80 in the memory unit 50 and controls a video input of the codec processing unit 40 and an audio input of the audio converter 71 with reference to the stored information.

Data transmitted from the opposite call party through the network communication unit 20 is decoded by the codec processing unit 40. The decoded video signal is graphic-processed and output to the scaler of the image processing unit 11, and the decoded audio signal is output through the speaker 73. The scaler scales the graphic-processed signal into a predetermined size and outputs the scaled signal to the display unit 13. Accordingly, the user can receive image and voice of the opposite call party.

The controller 60 may include a graphic processing module that performs graphic-processing on the data decoded by the codec processing unit 40. In other words, the controller 60 can be realized as a CPU having a graphic function when the controller 60 is provided as a CPU.

A video/audio input of a video call image displayed on the display apparatus 100, and a sound may be changed according to user's setting.

In other words, when a user wants to receive only an image of an opposite call party, the codec processing unit 40 decodes only data of the opposite call party received through the network 300. When the user wants to receive the image of the opposite call party and an image of the external source 200, the codec processing unit 40 combines the data received through the network 300 and a second video signal input through the external source 200 and processes the combined data. According to this exemplary embodiment, a screen displayed on the display apparatus 100 of the user may be similar to the screen of FIG. 3.

More specifically, a combined image of the second video signal input from the external source 200 and the image of the opposite call party is displayed on the video call function execution window, as shown in the exemplary embodiment of FIG. 3. "A" denotes a default screen when a network function is selected, "B" denotes a video call function execution window displaying a second video signal input from the external source 200, and "C" denotes an image of an opposite call party displayed in a predetermined area. The video call function execution window may be displayed over the entire screen in the area of "A", and a display size and a display location of the image of the external source 200 and the opposite call party may vary depending on user's setting.

In addition, when the user wants to view the image of the opposite call party, the video signal from the external source 200, and an image of the user, the controller 60 controls the codec processing unit 40 to combine the three video signals.

An audio signal input can be freely selected as the video signal input.

According to another exemplary embodiment of the present invention, at least one audio input can be selected from among the microphone and the external source 200 by using the codec processing unit 40 rather than using the audio converter 71. The audio converter 71 converts all audio signals input from the external source 200 and the microphone and outputs the converted signals to the codec processing unit 40, which selects at least one of the audio signals input from the external source 200 and the microphone according to control of the controller 60.

Figure 4A:
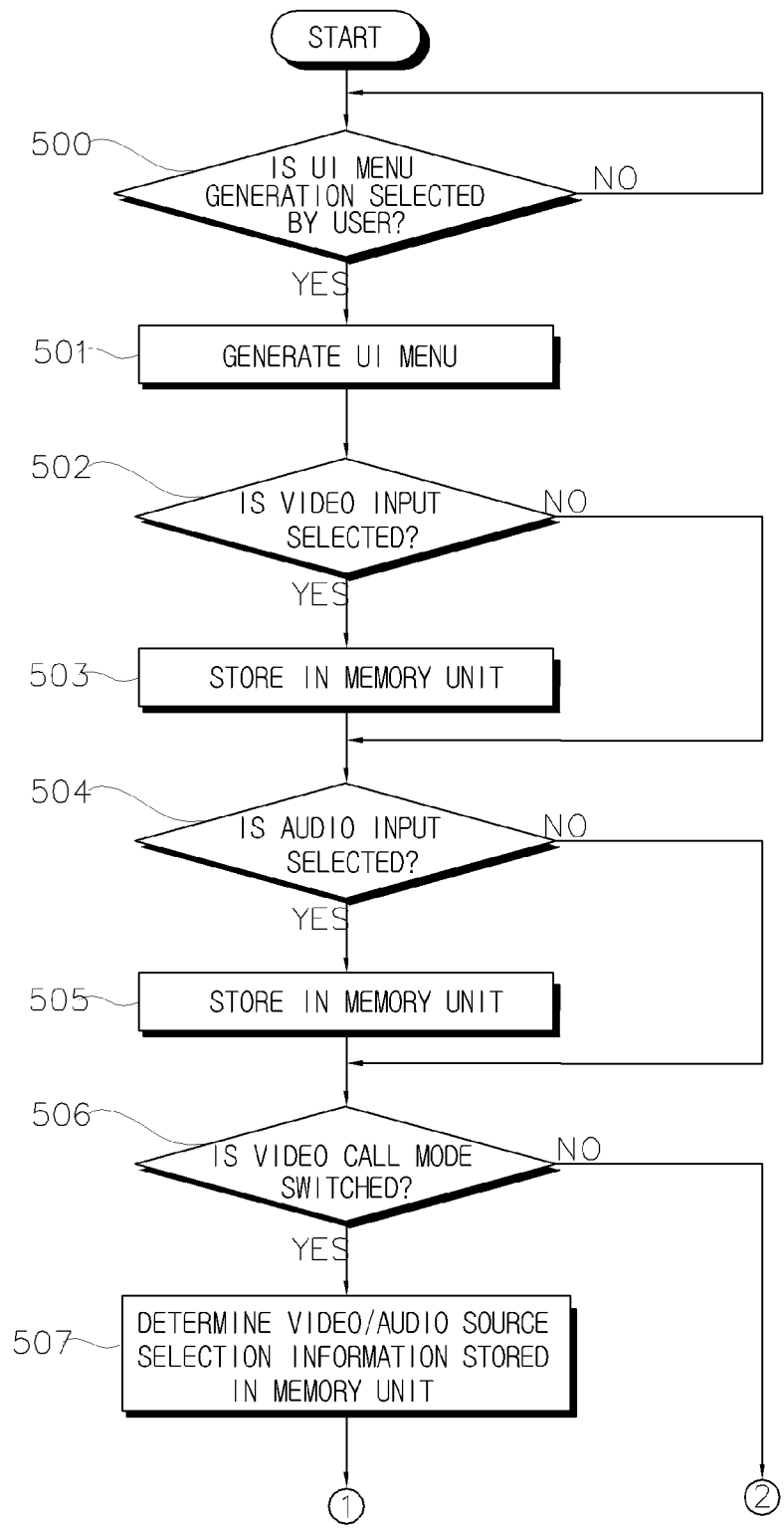
FIG. 4A and FIG. 4B show a flowchart of the display apparatus according to the first exemplary embodiment of the present invention.
Figure 4B:
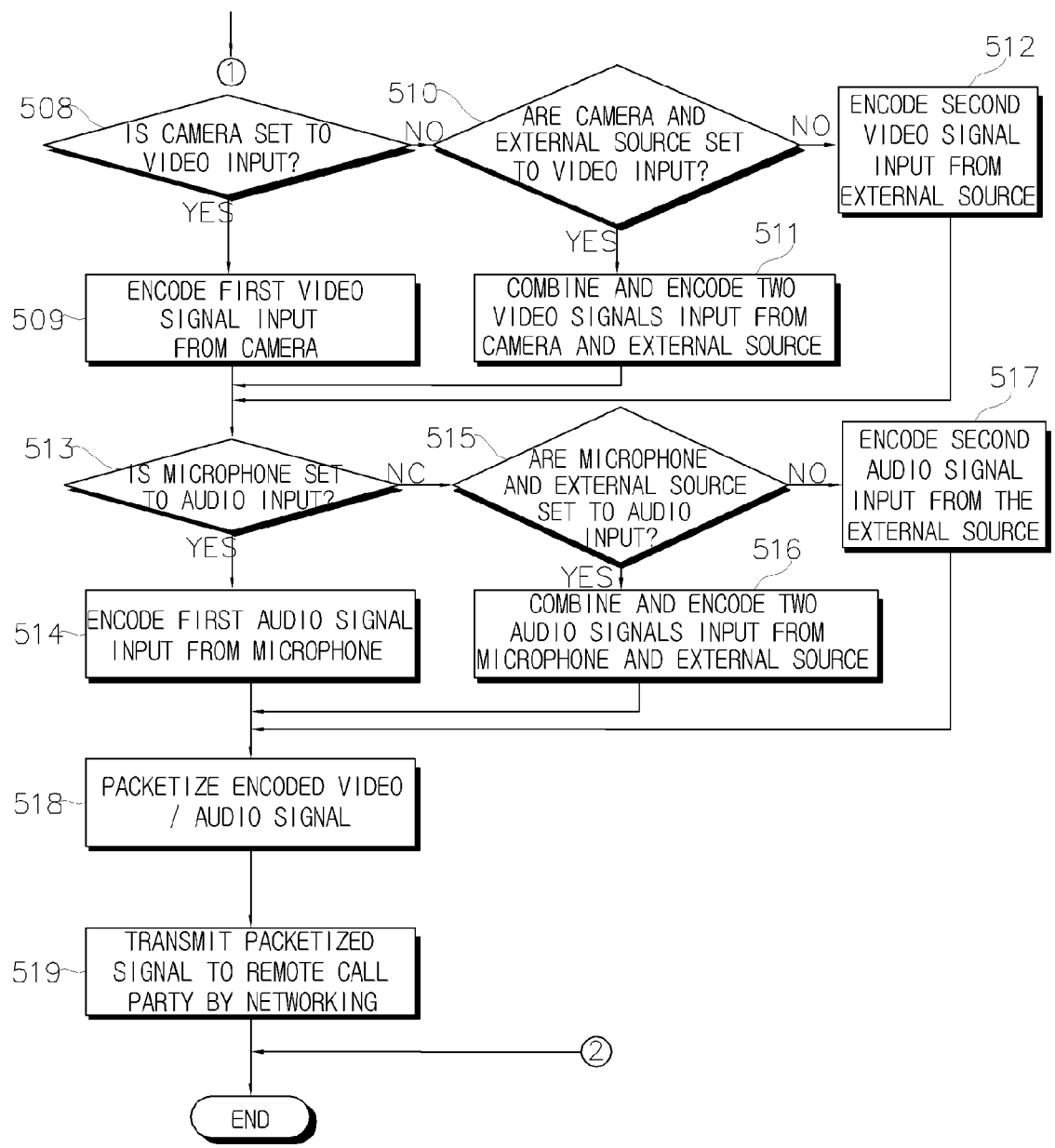

A control method of the display device 100 having the video call function according to the first exemplary embodiment will be described in further detail with reference to FIG. 4A and to FIG. 4B.

When the user selects UI menu generation through the user input unit 80, for setting of a video/audio input in the video call mode at operation of 500, the controller 60 controls the UI generator 90 to generate the corresponding UI menu and display the UI menu on the display unit 13 at operation of 501.

When a video input is selected through the user input unit 80 at operation of 502, the selected video input is stored as video source selection information in the memory unit 50 at operation of 503. In addition, when an audio input is selected through the user input unit 80 at operation of 504, the selected audio input is stored as audio source selection information in the memory unit 50 at operation of 505.

When a command for switching a current mode to the video call mode is input through the user input unit 80 at operation of 506, the controller 60 checks the video source selection information and the audio source selection information stored in the memory unit 50, at operation of 507.

When a camera is set to the video input at operation of 508, the controller 60 controls the codec processing unit 40 to encode a first video signal input from the camera at operation of 509. When both of the camera and the external source 200 are set to the video input at operation of 510, the controller 60 controls the codec processing unit 40 to combine and encode the first video signal input from the camera and a second video signal input from the external source 200, at operation of 511. In addition, when the external source 200 is set to the video input, the controller 60 controls the codec processing unit 40 to encode the second video signal input from the external source 200, at operation of 512.

When the microphone is set to the audio input at operation of 513, the controller 60 controls the audio converter 71 to convert a first analog signal input from the microphone and output the converted signal to the codec processing unit 40 at operation of 514. When both of the microphone and the external source 200 are set to the audio input at operation of 515, the controller 60 controls the audio converter 71 to convert and combine the first audio signal input from the microphone and a second audio signal input from the external source 200 and output the combined and encoded signal to the codec processing unit 40 at operation of 516. In addition, when the external source 200 is set to the audio input, the controller 60 controls the audio converter 71 to convert the second audio signal input from the external source 200 and output the converted signal to the codec processing unit 40 at operation of 517.

The encoded video/audio signal is packetized and then output to the network communication unit 20 at operation of 518, the network communication unit 20 transmits the received data packet to an opposite call party through the network 300 at operation of 519 by networking the received data packet.

A display apparatus 100 according to a second exemplary embodiment of the present invention will be described in further detail with reference to FIG. 5. Like reference numerals refer to like elements of the previous exemplary embodiment, and further descriptions of constituent elements that are the same as those of the previous exemplary embodiment of the present invention will be omitted.

Figure 5:
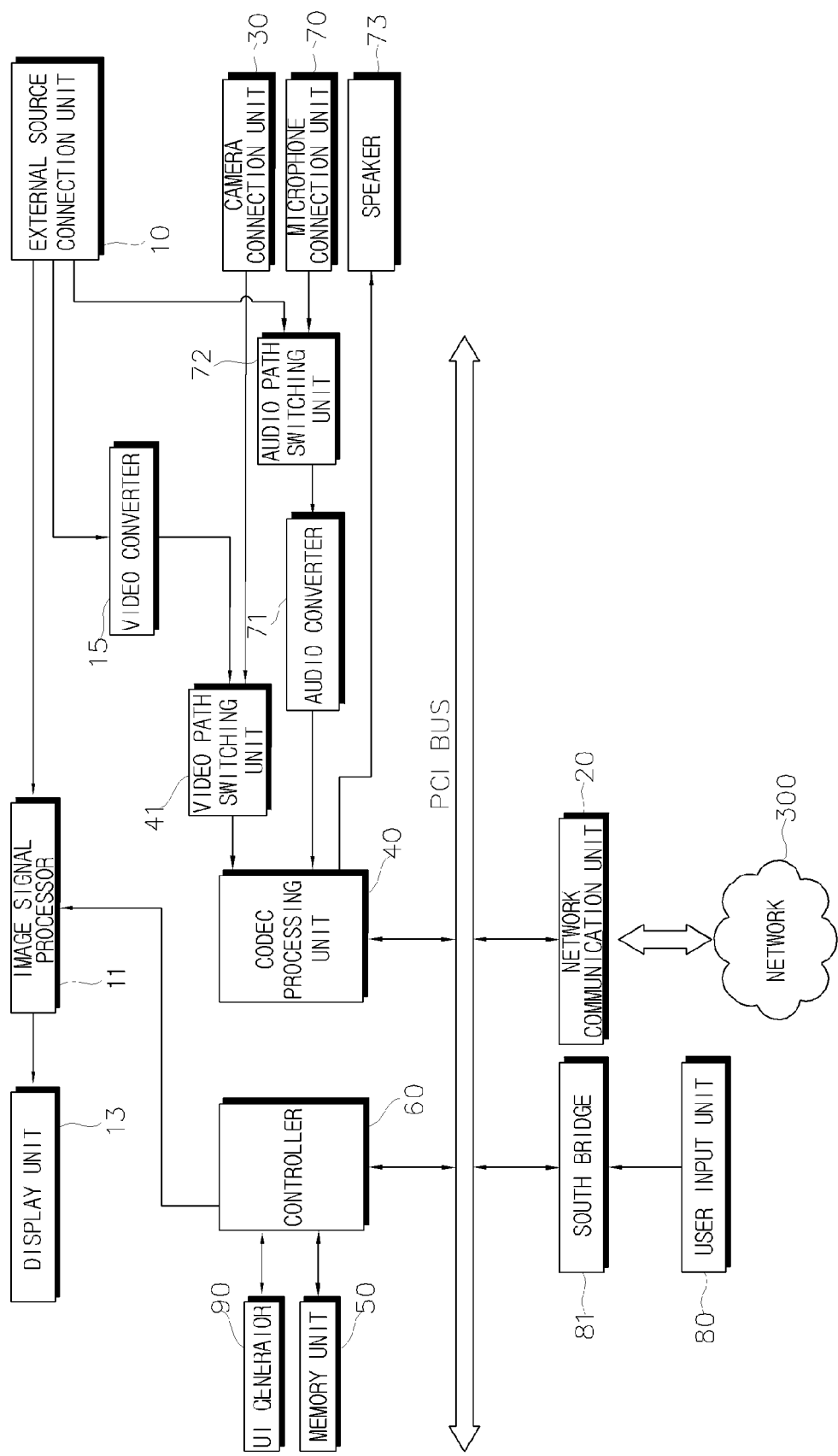
FIG. 5 is a control block diagram of a display apparatus according to a second exemplary embodiment of the present invention.

As shown in FIG. 5, the display apparatus 100 according to the second exemplary embodiment may further include a video path switching unit 41 and an audio path switching unit 72.

The video path switching unit 41 controls a video input path of a video signal input to the codec processing unit 40, and can be provided as a switching module or a multiplexer.

The video path switching unit 41 controls a video input from the camera and the external source 200. The controller 60 controls an operation of the video path switching unit 41 according to the video source selection information set in the memory as in the previous exemplary embodiment. The video path switching unit 41 switches an input path of a video input from the camera and an input path of a video input from the external source 200 so as to input either the video input from the camera or the video input from the external source or both of the video inputs from the camera and the external source 200 to the codec processing unit 40.

In addition, the audio path switching unit 72 controls an audio input from the microphone or the external source 200. The controller 60 controls the audio path switching unit 72 to output the corresponding audio signal to the audio converter 71 according to the audio source selection information set in the memory unit 50.

Accordingly, the user can share the second video signal and the second audio signal input from the external source 200 with the opposite call party.

A display apparatus 100 according to a third exemplary embodiment of the present invention will be described in further detail with reference to FIG. 6. Like reference numerals designate like constituent elements of the previous exemplary embodiments, and further descriptions of constituent elements that are the same as those of the previous exemplary embodiment of the present invention will be omitted.

As shown in FIG. 6, the display apparatus 100 according to the third exemplary embodiment may further include a video path switching unit 41 and an audio path switching unit 42.

The display device of the third exemplary embodiment is similar to that of the second exemplary embodiment, except that the audio path switching unit 42 is located between the audio converter 71 and the codec processing unit 40.

In other words, in the third exemplary embodiment of the present invention, the audio converter 71 processes and outputs audio signals input from the external source 200 and the microphone and the audio path switching unit 42 outputs one of the audio signals or both of the audio signals to the codec processing unit 40 according to control of the controller 60.

Accordingly, the user can share the second video and audio signals input from the external source 200 with the opposite call party.

As described above, various information input from a camera, a microphone, and an external source can be shared with the opposite call party by using the display apparatus, the control method of the display apparatus, and the video call system using the display apparatus and the control method according to the exemplary embodiment of the present invention.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus having a video call function, the display apparatus comprising:
   a camera connection unit to which a video camera is connected;
   a network communication unit which enables external network communication;
   a codec processing unit which encodes a video signal input from at least one of the video camera and a video data source different from the video camera and, outputs the encoded signal to the network communication unit, and decodes a video or audio signal received through the network communication unit; and
   a controller which controls the codec processing unit to process the video signal input from at least one of the video camera and the video data source corresponding to video source selection information and outputs the processed signal to the network communication unit during a video call,
   wherein the video source selection information is used to select at least one of the camera and the external source as a video input of the codec processing unit during the video call.

2. The display apparatus of claim 1, wherein the video data source comprises an external source connected via an external source connection unit.

3. The display apparatus of claim 1, further comprising a video converter which converts the video signal input from the video data source into an input format of the codec processing unit and outputs the converted signal to the codec processing unit.

4. The display apparatus of claim 1, further comprising;
   a user input unit through which a command is input; and
   a user interface (UI) generator which generates a UI menu through which the video signal of at least one of the camera and the video data source is selected as the video input during the video call,
   wherein the video source selection information is on the video input selected through the user input unit.

5. The display apparatus of claim 4, wherein, if both of the video signal from the camera and the video signal from the video data source are selected as the video input, the controller controls the codec processing unit to combine a first video signal input from the camera and a second video signal input from the video data source and output the combined signal to the network communication unit.

6. The display apparatus of claim 5, wherein the controller controls the codec processing unit to combine the video signal input through the network communication unit and the second video signal from the video data source and internally output the combined signal during the video call.

7. The display apparatus of claim 5, wherein the controller controls the codec processing unit to combine the video signal input through the network communication unit, the first video signal from the camera and the second video signal from the video data source, and internally output the combined signal during the video call.

8. The display apparatus of claim 5, further comprising a microphone connection unit to which a microphone is connected,
   wherein the codec processing unit encodes an audio signal input from at least one of the microphone and the video data source and outputs the encoded signal to the network communication unit,
   the controller controls the codec processing unit to process the audio signal from at least one of the microphone and the video data source corresponding to audio source selection information and output the processed signal to the network communication unit, and the audio source selection information is on an audio input of the codec processing unit during the video call.

9. The display apparatus of claim 8, wherein the UI generator generates the UI menu for a user to select the audio signal from at least one of the microphone and the video data source as the audio input for the video call, and the audio source selection information is on the audio input selected through the user input unit.

10. The display apparatus of claim 5, further comprising:
a microphone connection unit to which a microphone is connected; and
an audio converter which converts an audio signal input from at least one of the microphone and the video data source into an input format of the codec processing unit and outputs the converted signal to the codec processing unit,
wherein the codec processing unit encodes the input audio signal from the audio converter and outputs the encoded signal to the network communication unit,
the controller controls the audio converter to convert the audio signal from at least one of the microphone and the video data source corresponding to audio source selection information and output the converted signal to the codec processing unit for the video call, and
the audio source selection information is on an audio input selected through the user input unit.

11. The display apparatus of claim 10, wherein the UI generator generates the UI menu through which the audio signal from at least one of microphone and the video data source is selected as the audio input for the video call, and the audio source selection information is on the audio input selected through the user input unit.

12. A display apparatus having a video call function, the display apparatus comprising:
a camera connection unit to which a video camera is connected;
a network communication unit which enables external network communication;
a codec processing unit which encodes a video signal and an audio signal, outputs the encoded signal to the network communication unit, and decodes a video signal and an audio signal received through the network communication;
a video path switching unit which controls an input path of a first video signal input to the codec processing unit from the video camera and a second video signal input to the codec processing unit from a video data source different from the video camera; and
a controller which controls the video path switching unit to output at least one of the first and second video signals corresponding to video source selection information to the codec processing unit during a video call, wherein the video source selection information is used to select at least one of the video camera and the video data source as a video input of the codec processing unit during the video call.

13. The display apparatus of claim 12, wherein the video data source comprises an external source connected via an external source connection unit.

14. The display apparatus of claim 12, wherein, if both of the first video signal from the camera and the second video signal from the video data source are set to the video input, the controller controls the video path switching unit to output the first and second video signals to the codec processing unit, which combines the first video signal and the second video signal and outputs a combined signal to the network communication unit.

15. The display apparatus of claim 12, further comprising:
a microphone connection unit to which a microphone is connected; and
an audio path switching unit which controls an input path of a first audio signal input from the microphone to the codec processing unit and a second audio signal input from the video data source to the codec processing unit,
wherein the controller controls the audio path switching unit to output at least one of the first audio signal and the second audio signal corresponding to audio source selection information for the video call, and
the audio source selection information is on an audio input of the codec processing unit for the video call.

16. The display apparatus of claim 12, further comprising:
a microphone connection unit to which a microphone is connected;
an audio converter which converts an audio signal input from at least one of the microphone and the video data source into an input format of the codec processing unit and outputs the converted signal to the codec processing unit; and
an audio path switching unit that controls an input path of the first audio signal input from the microphone to the audio converter and the second audio signal input from the video data source to the audio converter,
wherein the codec processing unit encodes the audio signal input through the audio converter and outputs the encoded signal to the network communication unit,
the controller controls the audio path switch unit to output the audio signal from at least one of the microphone and the video data source corresponding to audio source selection information to the audio converter for the video call, and
the audio source selection information is on an audio input of the codec processing input for the video call, and
the audio source selection information is on an audio input of the codec processing input for the video call.

* * * * *